United States Patent [19]

Cerceau et al.

[11] Patent Number: 4,906,528
[45] Date of Patent: Mar. 6, 1990

[54] COMPOSITE CUTTING ELEMENT CONTAINING CUBIC BORON NITRIDE AND METHOD OF MAKING THE SAME

[75] Inventors: Jean M. Cerceau, Seussinet; Yves Boyat, Reaumont, both of France

[73] Assignee: Societe Industrielle De Combustible Nucleaire, Paris, France

[21] Appl. No.: 376,510

[22] Filed: Jul. 7, 1989

[30] Foreign Application Priority Data

Jul. 7, 1988 [FR] France ................ 88 09239

[51] Int. Cl.⁴ ............................................. B22F 7/06
[52] U.S. Cl. .................................... 428/552; 428/555; 428/557; 428/457; 428/627; 428/698; 419/6; 419/12; 419/14; 419/38; 75/244; 51/307
[58] Field of Search ............... 428/451, 553, 555, 557, 428/564, 565, 627, 698, 6; 419/12, 14, 38; 75/244; 51/307

[56] References Cited

U.S. PATENT DOCUMENTS

| | | | |
|---|---|---|---|
| 4,647,546 | 3/1987 | Hall, Jr. et al. | 501/ |
| 4,764,434 | 8/1988 | Avonsson et al. | 428/565 |
| 4,766,040 | 8/1988 | Hillert et al. | 428/552 |
| 4,797,326 | 1/1989 | Csillag | 428/551 |

Primary Examiner—Stephen J. Lechert, Jr.
Assistant Examiner—Ngoclan T. Mai
Attorney, Agent, or Firm—Fleit, Jacobson, Cohn, Price, Holman & Stern

[57] ABSTRACT

A cutting element of flat shape suitable for use as a drill tip comprises a central abrading blade containing more than 80% vol. CBN sandwiched between two lateral support layers. The lateral layers consist of a refractory metal or alloy selected from the group consisting of tungsten, titanium and alloys thereof. The compact may particularly have a roof or pentagonal shape. An intermediate transition film may be located between the refractory metal or alloy and the CBN blade.

9 Claims, 1 Drawing Sheet

COMPOSITE CUTTING ELEMENT CONTAINING CUBIC BORON NITRIDE AND METHOD OF MAKING THE SAME

BACKGROUND OF THE INVENTION

1. Technical Field

The invention relates to flat cutting elements of flat shape, suitable for use more particularly for forming the tip of twist drills, of composite nature, comprising a central abrasive blade having a content greater than 80% vol. of a ultra-hard material sandwiched between two lateral support layers.

2. Prior Art

Cutting elements of the above type are already known whose ultra-hard material is a polycrystalline diamond compact, the term "compact" designating a sintered product formed by grains bounded together by bridges, created by diffusion of material in the plastic condition. Document No. EP-A-0,180,243 describes for example a composite cutting element having a central blade consisting of a diamond compact connected to metal carbide support layers via intermediate layers formed of a material whose heat expansion coefficient provides a transition between the support and the blade and which prevents diffusion of the catalyst binder between carbide and diamond during manufacture of the element by welding. The ratio between the added thicknesses of the lateral layers and the thickness of the blade is generally between 1 and 2.

Such a cutting element is unfortunately hardly suitable for drilling materials containing iron, due to the chemical reactivity of diamond. A compact of cubic boron nitride, abbreviated to CBN, is known to have a chemical stability greater than that of diamond when in presence of iron. Consequently it has already been proposed to use CBN compacts to replace polycrystalline diamond compacts whenever a ferrous metal is to be machined. The CBN compacts are produced by adding a catalyst binder to the CBN. Among the catalyst binders, a mixture of elementary silicon and materials supplying carbon and aluminium is particularly favorable (EP-A-0,181,258).

If an attempt is made to substitute a CBN compact for a diamond compact in a flat cutting element having lateral tungsten carbide layers, problems. If the carbide layer is directly bounded to the blade, binder contained in the carbide diffuses, during sintering into the abrasive layer and CBN in the final cutting element is no longer thermostable. If, in order to prevent such diffusion, intermediate layers are provided, i.e. if a construction is adopted to the kind described in document No. EP-A-0,180,243 for diamond containing cutting elements, the thickness is increased to such an extent that the flat cutting element becomes difficult to use.

It has also been proposed to locate a CBN cutting blade on a support via a molybdenum layer (JP-a-60 263 601 and JP-A-60 263 602) under conditions of pressure, temperature and duration which appeared insufficient for providing a compact.

SUMMARY OF THE INVENTION

Consequently, the invention provides a flat cutting element of composite nature for drills, comprising a central abrasive blade having a content higher than 80% by volume of ultra-hard material sandwiched between a pair of lateral support layers, the ratio between the accumulative thicknesses of the lateral layers and the thickness of the blade being between 1 and 2. The ultra-hard material of the blade is essentially a CBN compact and the lateral parts consist of a refractory metal or alloy selected from the group consisting of tungsten, titanium and alloys thereof and have a metallurgical and chemical connection with the blade.

Tungsten makes it possible to obtain, perhaps due to a porosity resulting from its manufacturing process, a bond of CBN which is much higher than that of molybdenum.

A transition may be insured by providing interface zones of small thickness containing both the refractory metal or alloy and CBN. In order to increase the strength of the compact, the latter may be manufactured so as to be formed essentially of CBN grains having an intergranular bond in a binder of ceramic nature, formed of carbide and/or boride of silicon and aluminium, substantially devoid of free aluminium and silicon. The borides and carbides are obtained by adding to the product forming the CBN compact, during manufacture, silicon in elementary or alloyed form, a carbon supplying material and a material supplying aluminium (the material supplying carbon being possibly elementary carbon, for example in the form of diamond powder, and the material supplying aluminium being possibly aluminium itself).

The invention also provides a method of manufacturing a cutting element of the above-defined according to which: on the bottom of a cup, there are successively placed a layer of refractory metal in powder or strip form, a layer of CBN and of catalyst binder, the CBN representing 80% by volume at least of the CBN-binder body, and a new layer of refractory metal in powder or strip form; the cup is sealed and the assembly formed by the cup and the stack which it contains is subjected to temperature and pressure conditions at which the CBN is in stable thermodynamic condition for a time sufficient to insure sintering and the intergranular bond of the CBN grains in the compact.

Maintaining the high temperature and pressure for a time between 3 and 30 mn will generally be satisfactory; the high pressure must be maintained during the temperature rise and fall.

The catalyst binder may be in powder form and be mixed with the CBN powder; it may also be in the form of a thin sintered disk placed in direct contact with the layer of CBN powder.

Thus a disk of sandwich material is finally obtained which may be cut either by electro-erosion, when the catalyst binder used leads to a product which lends itself to this kind of cutting, or by laser to give it an appropriate shape, for example having roof or pentagonal shape, depending on the type of drill on which the element is to be mounted.

To enhance the bond between CBN and refractory metal, a thin film of a metal capable of reacting chemically with the two components and thus reducing the interface stresses is preferably located between the CBN layer and the refractory metal layers. When the refractory metal is tungsten, the metal capable of reacting may typically be titanium.

The invention will be better understood from the following description of particular embodiments, given by way of non-limitative examples. The description refers to the accompanying drawings, in which the scale has not been respected for greater clarity.

DETAILED DESCRIPTION OF PREFERRED EMBODIMENTS

Figure 1:
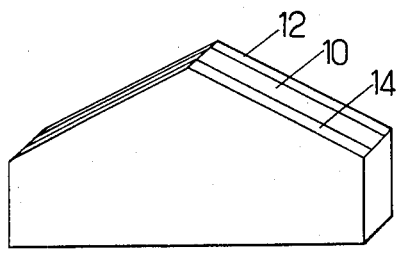
FIG. 1 is a perspective view of a sandwich cutting element according to a first embodiment of the invention, having a central portion formed of a CBN compact and lateral support layers of tungsten.

A cutting element according to the invention will frequently have a roof shape, of the kind shown schematically in FIG. 1; the element comprises a central portion 10 in the form of a blade, consisting of a CBN compact whose thickness will generally be between 0.4 and 1.0 mm, depending on the planar size of the cutting element. The blade 10 is straddled by lateral layers 12 and 14 having a metallurgical bond with blade 10, of a refractory metal or alloy, generally of the same thickness. The ratio between the sum of the thicknesses of the lateral layers and the thickness of the blade will generally be of from 1:1 to 2:1.

Figure 2:
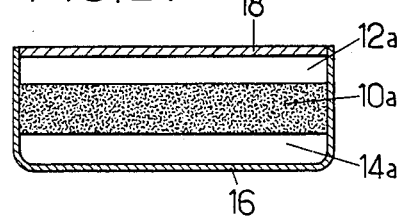
FIG. 2 shows schematically, in a cup, the stack of components for forming a cutting element in accordance with FIG. 1, before it is processed in a press.

To manufacture such an element, in a cup 16 generally made from molybdenum (FIG. 2), are placed a layer 14a intended to give rise to refractory metal layers, in powder or stripp condition, then a powder layer 10a intended to give rise to the blade and a layer 12a identical to layer 14a. The cup 16 is closed with a lid 18 and the cell thus formed is loaded into a press while contained in a medium able to transmit the heat and the pressure. In the press, the cup is subjected to pressures greater than 45 kbars, and a temperature which exceeds 1400° C. Thus a composite refractory metal-CBN-refractory metal disk is obtained from which elements can be obtained, by laser cutting or by electro-erosion, having the form shown in FIG. 1 or other forms.

Particular embodiments will now be given as non-limitative examples.

EXAMPLE 1

To form elements of the kind shown in FIG. 1, two disks of metal tungsten 14a and 12a of 21 mm in diameter are placed on each side of a layer 10a of CBN powder having a grain size between 1 and 30 µm, to which aluminium, silicon and diamond have been added in proportion which are those given in the document No. EP-A-0,181,258, the percentage by volume of CBN being at least 85%. Tests have been carried out particularly with tungsten disks 0.5 mm thick straddling a layer containing 85% of CBN having a thickness of 0.7 mm. A composite disk was obtained by processing in a press for 8 mn, at a pressure of 55 kbars which is maintained for a temperature cycle including heating up to 1550° C., maintaining this temperature for 6 mn, then decreasing the temperature to ambient temperature. Elements of the kind shown in FIG. 1 were then cut out from this disk with a laser beam.

Figure 3:
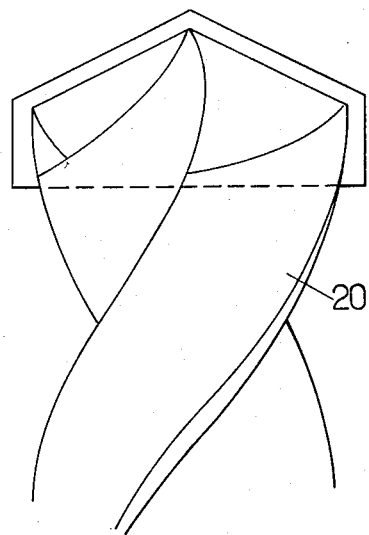
FIG. 3 shows a possible method of mounting the element of FIG. 1 on the end portion of a twist drill.

The cutting element thus obtained may be fixed to a drill shank 20 having two helical lips and an end slit for receiving the cutting element. Bending may be by brasing for joining the lateral tungsten layers to the steel of the drill shank and shaping of the cutting edge may be by sharpening (FIG. 3).

EXAMPLE 2

Figure 4:
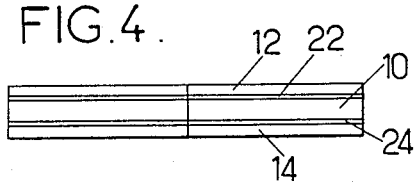
FIG. 4 is a top view of a cutting element similar to that of FIG. 1, but comprising an interface film of an additional metal providing chemical combination.

As mentioned above, it is advantageous to enhance the bond between CBN and refractory metal by inserting a metal interface capable of reacting chemically with the other components. As shown in FIG. 4, the interface is formed by thin films 22 and 24 obtained as follows: during formation of the stack in the cup of FIG. 2, a thin film of titanium is deposited, for example by PVD, on the tungsten at each tungsten/CBN interface. The layer is less than 25 µm thick and so does not substantially increase the total thickness of the cutting element. When the stack is subjected to a high pressure and a high temperature, the titanium of films 22 and 24 reacts with boron, nitrogen and tungsten to form various compounds. The products of the chemical reaction reinforce the interface. Titanium improves the chemical connection between the central blade and the lateral layers and accomodates the differential thermal expansions of the CBN and the tungsten. Reinforcement of the bond and accomodation of the expansion differentials make it possible to obtain a better flatness than in the case of Example 1.

EXAMPLE 3

Figure 5:
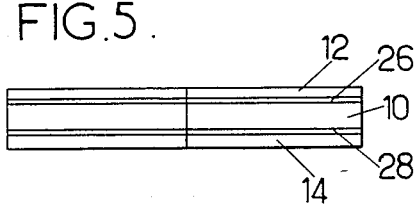
FIG. 5, similar to FIG. 4, shows a cutting element comprising an intermediate interface layer containing both tungsten and CBN.

The cutting element shown in FIG. 5 differs essentially from the preceding one in that intermediate layers 26 and 28 of CBN and tungsten are inserted between blade 10 and the lateral layers 12 and 14. For that, during stacking in cup 16, an intermediate layer 100 µm thick, formed of CBN and tungsten powder in equal proportions by volume, is disposed on each side of layer 10a. By this method, the strength of the CBN/W interface is further increased, by accomodating the stresses due to sintering.

EXAMPLE 4

A cutting element identical to that shown schematically in FIG. 1 was obtained by replacing the tungsten disks by titanium disks so as to form the lateral layers 12 and 24. Two metal titanium disks each 0.5 mm thick were placed on each side of layer 10a of CBN, to which a catalyst binder was added. The CBN powder again had a grain size between 1 and 30 µm. The temperature and pressure conditions applied were the same as in Example 1.

EXAMPLE 5

To form a cutting element having the sandwich construction shown in FIG. 1, the component elements of the CBN compact of blade 10 were placed in a cup, in the form of a pure CBN and diamond powder layer and a thin compacted layer of aluminium powder, over which was molded a thin layer of compacted silicon placed between the titanium disk and CBN powder.

EXAMPLES 6 AND 7

The same operating conditions as in Example 1 were reproduced, but using as catalyst binder, first, aluminium alone (Example 6), and, second, aluminium and titanium compounds (Example 7). Thus usable cutting elements were obtained having slightly less favorable characteristics due to the lack of silicon.

EXAMPLE 8

The same operating conditions as in Example 5 were adopted, but using solely aluminium as catalyst binder: again a slight degradation of the final properties was observed due to the absence of silicon.

Figure 6:
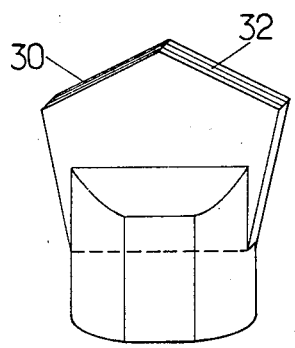
FIG. 6, similar to FIG. 3, is an elevational view, showing a cutting element of pentagonal shape in accordance with the invention fitted on a drill which has no twisted lip.

With the invention, cutting elements may be obtained having very different shapes. In particular, it makes it possible to form cutting elements of pentagonal shape of the kind shown in FIG. 6, frequently used for fitting the head of flat drills. Fixing may again be by brasing and-/or jamming.

Furthermore, it is not indispensable for the central CBN compact blade to occupy all the cross-section of the cutting element: it is possible to form elements in which only the cutting lips (edges 30 and 32 in FIG. 6) and a portion of the lateral lips comprise a central blade of CBN compact.

I claim:

1. A flat cutting element for a drill, comprising a central abrading blade consisting of a sintered cubic boron nitride compact having a cubic boron nitride content higher than 80% vol. sandwiched between a pair of lateral support layers composed of a refractory metal selected from the group consisting of tungsten, titanium and alloys thereof and having a metallurgical bond with the blade, the sum of the thicknesses of the lateral layers being in a ratio of from 1:1 to 2:1 with the thickness of the blade.

2. Cutting element as defined in claim 1, wherein the compact substantially consists of cubic boron nitride grains having a mutual intercrystalline bonding within a ceramic binder essentially consisting of at least one of silicon carbide, silicon boride, aluminium carbide and aluminium boride, substantially devoid of free aluminium and silicon.

3. Cutting element according to claim 1, further comprising interfaces of low thicknesses containing said refractory metal and cubic boron nitride separating said abrading blade from said support layers.

4. A process for manufacturing a cutting element having a sandwich structure, comprising the steps of:
   successively placing, in a cup, a first layer of a refractory metal selected from the group consisting of tungsten, titanium and alloys thereof in powder or strip form, a layer of cubic boron nitride grains and catalytic binder, the amount of the CBN being of at least 80% vol. of the CBN-binder layer, and a second layer of said refractory metal in powder or strip form;
   sealing the cup; and
   subjecting the cup containing said layers to temperature and pressure conditions at which cubic boron nitride is in stable thermodynamic condition, for a sufficient time to cause sintering and intercrystalline bonding of the cubic boron nitride grains as a sintered compact.

5. Process according to claim 4, further comprising the step of placing a film of a metal selected for chemically reacting with said cubic boron nitride and said refractory metal between the cubic boron nitride-binder layer and each of said refractory metal layers, said film having a thickness which is smaller than that of the cubic boron nitride-binder layer by at least one order of magnitude.

6. Process according to claim 5, wherein said refractory metal is tungsten and the metal of the film is titanium.

7. Process according to claim 4, wherein said catalytic binder is an aluminium supplying material.

8. Process according to claim 4, wherein said catalytic binder essentially consists of elementary silicon and a matter which supplies carbon and aluminium.

9. Process according to claim 8, wherein said matter essentially consists of diamond and aluminium in powder form.

* * * * *